(12) United States Patent
Cha et al.

(10) Patent No.: US 11,391,204 B2
(45) Date of Patent: Jul. 19, 2022

(54) HYBRID POWER GENERATION EQUIPMENT

(71) Applicant: DOOSAN HEAVY INDUSTRIES & CONSTRUCTION CO., LTD., Changwon (KR)

(72) Inventors: Song-Hun Cha, Osan (KR); Sung Gju Kang, Yongin (KR); Ki Hyun Lee, Daegu (KR)

( * ) Notice: Subject to any disclaimer, the term of this patent is extended or adjusted under 35 U.S.C. 154(b) by 0 days.

(21) Appl. No.: 17/120,196

(22) Filed: Dec. 13, 2020

(65) Prior Publication Data

US 2022/0136412 A1    May 5, 2022

(30) Foreign Application Priority Data

Oct. 30, 2020   (KR) .................. 10-2020-0143272
Dec. 2, 2020    (KR) .................. 10-2020-0166650

(51) Int. Cl.
| | |
|---|---|
| F02C 6/18 | (2006.01) |
| F02C 7/10 | (2006.01) |
| F01K 21/04 | (2006.01) |
| F01K 23/10 | (2006.01) |

(52) U.S. Cl.
CPC .................. *F02C 6/18* (2013.01); *F02C 7/10* (2013.01); *F01K 21/047* (2013.01); *F01K 23/103* (2013.01)

(58) Field of Classification Search
CPC .... F02C 6/18; F02C 7/10; F01K 23/10; F01K 23/103; F01K 21/047
See application file for complete search history.

(56) References Cited

U.S. PATENT DOCUMENTS

| | | | | |
|---|---|---|---|---|
| 2,717,491 A | * | 9/1955 | Barr ...................... | F01K 23/103 60/785 |
| 2001/0047649 A1 | * | 12/2001 | Ranasinghe .......... | F01K 21/047 60/775 |
| 2010/0083666 A1 | * | 4/2010 | Brook .................... | C01B 3/382 60/780 |

(Continued)

FOREIGN PATENT DOCUMENTS

| | | |
|---|---|---|
| JP | 05195721 A | 8/1993 |
| JP | 06317108 A | 11/1994 |

(Continued)

*Primary Examiner* — William H Rodriguez
(74) *Attorney, Agent, or Firm* — Harvest IP Law, LLP

(57) ABSTRACT

Disclosed is a hybrid power generation facility. The hybrid power generation facility includes a gas turbine including a compressor configured to compress air introduced from an outside, a combustor configured to mix the compressed air with fuel and to combust the air and fuel mixture, and a turbine configured to produce power with first combustion gas discharged from the combustor, a boiler including a combustion chamber and configured to burn a mixture of the first combustion gas and air, a first water heat exchanger configured to pass second combustion gas discharged from the boiler and to heat water through heat exchange with the second combustion gas, a water supply device configured to supply water to the first water heat exchanger, a steam turbine through which steam generated in the combustion chamber passes, and a first air preheater configured to pass second combustion gas discharged from the first water heat exchanger and to pass air supplied to the boiler.

18 Claims, 6 Drawing Sheets

(56) References Cited

U.S. PATENT DOCUMENTS

| | | | | |
|---|---|---|---|---|
| 2017/0152765 A1* | 6/2017 | Uechi | .................... | F01K 25/10 |
| 2017/0350319 A1* | 12/2017 | Wu | ........................ | F01D 15/10 |
| 2021/0254547 A1* | 8/2021 | Deng | ........................ | F02C 6/04 |

FOREIGN PATENT DOCUMENTS

| | | |
|---|---|---|
| JP | 2012037180 A | 2/2012 |
| JP | 2019095174 A | 6/2019 |

* cited by examiner

HYBRID POWER GENERATION EQUIPMENT

CROSS REFERENCE TO RELATED APPLICATIONS

This application claims priority to Korean Patent Application No. 10-2020-0143272, filed on Oct. 30, 2020 and Korean Patent Application No. 10-2020-0166650, filed on Dec. 2, 2020, the disclosures of which are incorporated herein by reference in their entireties.

BACKGROUND

1. Field

The present disclosure relates to a hybrid power generation facility, and more particularly, to a hybrid power generation facility for generating electric power using a driving force generated by a gas turbine and a steam turbine.

2. Description of the Related Art

There are various types of power plants depending on fuel used. A thermal power plant heats water in a boiler using thermal energy generated by burning fuels such as coal, heavy oil, and natural gas, and passes a high temperature and high pressure superheated steam produced through a steam turbine so that a generator connected to the steam turbine generates electricity.

The thermal power plant includes main equipment and balance of plant (BOP) systems. The BOP systems include, for example, a fuel supply system, a fuel treatment system, a condensate and water supply system, a cooling water system, a reprocessing system, and auxiliary systems such as air treatment system, water treatment system, service water treatment system, and waste water treatment system. The main equipment and BOP systems play their roles in electricity production.

On the other hand, a combined cycle power plant is a power plant that combines a primary power generation cycle in which a gas turbine is driven with fuel such as natural gas or diesel and a secondary power generation cycle in which a steam turbine is driven with steam generated by passing the heat of exhaust gas discharged from the gas turbine through a heat recovery steam generator (HRSG). The combined cycle power plant has the advantage of 10% higher thermal efficiency, less pollution, and shorter resting time than conventional thermal power plants.

In a conventional combined cycle power plant, exhaust gas of a boiler is used to preheat air supplied to the boiler through heat exchange between the exhaust gas and the air, water is heated by the exhaust gas to become steam, and the steam is supplied to a steam turbine. Referring to FIG. 1, a conventional hybrid power generation facility 10 includes an air preheater 11 for heating air through heat exchange between air and exhaust gas, a water heat exchanger 12 for heating water through heat exchange between water and exhaust gas, a boiler pipeline 14 for supplying exhaust gas to the air preheater 11, and a bypass pipeline 15 branched from the boiler pipeline 14 to supply the exhaust gas to the water heat exchanger 12.

In the conventional hybrid power generation facility, the boiler pipeline 14 for supplying exhaust gas from a boiler 13 to the air preheater 11 and the bypass pipeline 15 branched from the boiler pipeline 14 to supply the exhaust gas to the water heat exchanger 12 are separately provided. This increases the number of parts used in the facility, resulting in complex construction and complicated operation of the power generation facility.

SUMMARY

The present disclosure has been made in view of the problems occurring in the related art and an objective of the present disclosure is to provide a hybrid power generation facility that reduces the number of parts used in the facility and simplifies an operation of the facility.

According to an aspect of the present disclosure, there is provided a hybrid power generation facility including: a gas turbine including a compressor configured to compress air introduced from an outside, a combustor configured to mix the compressed air with fuel and to combust the air and fuel mixture, and a turbine configured to produce power with first combustion gas discharged from the combustor; a boiler including a combustion chamber and configured to burn a mixture of the first combustion gas and air; a first water heat exchanger configured to pass second combustion gas discharged from the boiler and to heat water through heat exchange with the second combustion gas; a water supply device configured to supply water to the first water heat exchanger; a steam turbine through which steam generated in the combustion chamber passes; and a first air preheater configured to pass second combustion gas discharged from the first water heat exchanger and to pass air supplied to the boiler.

The hybrid power generation facility may further include: a first boiler pipeline configured to transfer second combustion gas from the boiler to the first water heat exchanger; and a second boiler pipeline configured to transfer second combustion gas from the first water heat exchanger to the first air preheater.

The steam turbine may include an intermediate-pressure turbine and a low-pressure turbine connected to the intermediate-pressure turbine and configured to pass steam having a pressure smaller than that of steam flowing through the intermediate-pressure turbine. The water supply device may include an intermediate-pressure water supplier configured to receive steam passing through the intermediate-pressure turbine and a low-pressure water supplier configured to receive steam passing through the low-pressure turbine. The first water heat exchanger may be configured to pass water supplied from the intermediate-pressure water supplier.

The hybrid power generation facility may further include a second water heat exchanger configured to pass second combustion gas discharged from the first air preheater and to pass water supplied to the boiler.

The hybrid power generation facility may further include a third boiler pipeline configured to transfer second combustion gas from the first air preheater to the second water heat exchanger.

The hybrid power generation facility may further include an auxiliary heat exchanger configured to pass water supplied from a condenser to the low-pressure water supplier and to pass carbon dioxide that is collected from the second combustion gas discharged from the boiler and is compressed to heat water.

The hybrid power generation facility may further include: a first water pipeline configured to transfer water from the intermediate-pressure water supplier to the first water heat exchanger; a second water pipeline connected in parallel with the first water pipeline and configured to supply water to the first water heat exchanger; a first water valve installed in the first water pipeline; and a second water valve installed in the second water pipeline and configured to have a lower flow rate than the first water valve if the first and second water valves are fully opened.

If an output of the gas turbine has a value greater than or equal to a first reference output value that is preset, the first water valve is opened and the second water valve is closed. If the output of the gas turbine has a value less than the first reference output value, the first water valve is closed and the second water valve is opened.

The hybrid power generation facility may further include: a third water pipeline configured to flow water discharged from the first water heat exchanger; and a first temperature sensor installed in the third water pipeline and configured to measure a temperature of water flowing through the third water pipeline. In a state in which the output of the gas turbine has a value equal to or greater than the first reference output value, an opening of the first water valve increases if the temperature of water measured by the first temperature sensor is higher than an upper limit of a first reference temperature range that is preset, and the opening of the first water valve decreases if the temperature of the water measured by the first temperature sensor is lower than a lower limit of the first reference temperature range. In a state in which the output of the gas turbine has a value less than the first reference output value, an opening of the second water valve increases if the temperature of water measured by the first temperature sensor is higher than an upper limit of a second reference temperature range that is preset, and the opening of the second water valve decreases if the temperature of the water measured by the first temperature sensor is lower than a lower limit of the second reference temperature range.

The hybrid power generation facility may further include: a fourth water pipeline configured to transfer water from the low-pressure water supplier to the second water heat exchanger; a fifth water pipeline connected in parallel with the fourth water pipeline and configured to supply water to the second water heat exchanger; a third water valve installed in the fourth water pipeline; and a fourth water valve installed in the fifth water pipeline and configured to have a lower flow rate than the third water valve if the third and fourth water valves are fully opened.

If an output of the gas turbine has a value greater than or equal to a first reference output value that is preset, the third water valve is opened and the fourth water valve is closed. If the output of the gas turbine has a value less than the first reference output value, the third water valve is closed and the fourth water valve is opened.

The hybrid power generation facility may further include: a fourth boiler pipeline configured to pass second combustion gas discharged from the second water heat exchanger; and a second temperature sensor installed in the fourth boiler pipeline and configured to measure a temperature of the second combustion gas flowing through the fourth boiler pipeline. In a state in which the output of the gas turbine has a value equal to or greater than the first reference output value, an opening of the third water valve increases if the temperature of second combustion gas measured by the second temperature sensor is higher than an upper limit of a third reference temperature range that is preset, and the opening of the third water valve decreases if the temperature of the second combustion gas measured by the second temperature sensor is lower than a lower limit of the third reference temperature range. In a state in which the output of the gas turbine has a value less than the first reference output value, an opening of the fourth water valve increases if the temperature of second combustion gas measured by the second temperature sensor is higher than an upper limit of a fourth reference temperature range that is preset, and the opening of the fourth water valve decreases if the temperature of the second combustion gas measured by the second temperature sensor is lower than a lower limit of the fourth reference temperature range.

The hybrid power generation facility may further include: a first air pipeline configured to supply air to the first air preheater; a second air pipeline configured to transfer air from the first air preheater to the boiler; a third air pipeline connecting the first air pipeline and the second air pipeline; a third temperature sensor installed in the second air pipeline and configured to measure a temperature of air flowing through the second air pipeline; and a damper installed in the third air pipeline and configured to adjust a flow rate of air flowing through the third air pipeline according to an air temperature measured by the third temperature sensor.

The third temperature sensor may be disposed downstream than a junction of the second air pipeline and the third air pipeline in a flow direction of air flowing through the second air pipeline.

The hybrid power generation facility may further include: a sixth water pipeline configured to transfer water from the low-pressure water supplier to the intermediate-pressure water supplier; and a fifth water valve installed in the sixth water pipeline to open and close the sixth water pipeline. The fifth water valve may be closed if an output of the gas turbine has a value greater than or equal to a first reference output value that is preset, and the fifth water valve is opened if the output of the gas turbine has a value less than the first reference output value.

The hybrid power generation facility may further include: a first water pipeline configured to transfer water from the intermediate-pressure water supplier to the first water heat exchanger; a fourth water pipeline configured to transfer water from the low-pressure water supplier to the second water heat exchanger; a first shut-off valve installed in the first water pipeline; and a second shut-off valve installed in the fourth water pipeline. If the output of the gas turbine has a value less than the second reference output value, the first shut-off valve closes the first water pipeline.

The hybrid power generation facility may further include: a sixth water pipeline configured to transfer water from the low-pressure water supplier to the intermediate-pressure water supplier; and a fifth water valve installed in the sixth water pipeline to open and close the sixth water pipeline. The fifth water valve is opened if the output of the gas turbine has a value less than the second reference output value.

The hybrid power generation facility may further include: a second air preheater configured to pass air discharged from the first air preheater and to pass second combustion gas discharged from the boiler; a first boiler pipeline configured to transfer second combustion gas from the boiler to the second air preheater; a fifth boiler pipeline configured to transfer second combustion gas from the second air preheater to the first water heat exchanger; a second air pipeline configured to transfer air from the second air preheater to the boiler; and a fourth air pipeline configured to transfer air from the first air preheater to the second air preheater.

The hybrid power generation facility according to the present disclosure is designed such that second combustion gas discharged from the boiler sequentially passes through the first boiler pipeline, the first water heat exchanger, the second boiler pipeline, the first air preheater, the third boiler pipeline, and the second water heat exchanger. Therefore, the overall construction and operation of the hybrid power generation facility are simple because bypass pipelines are omitted.

DETAILED DESCRIPTION OF THE DISCLOSURE

Figure 1:
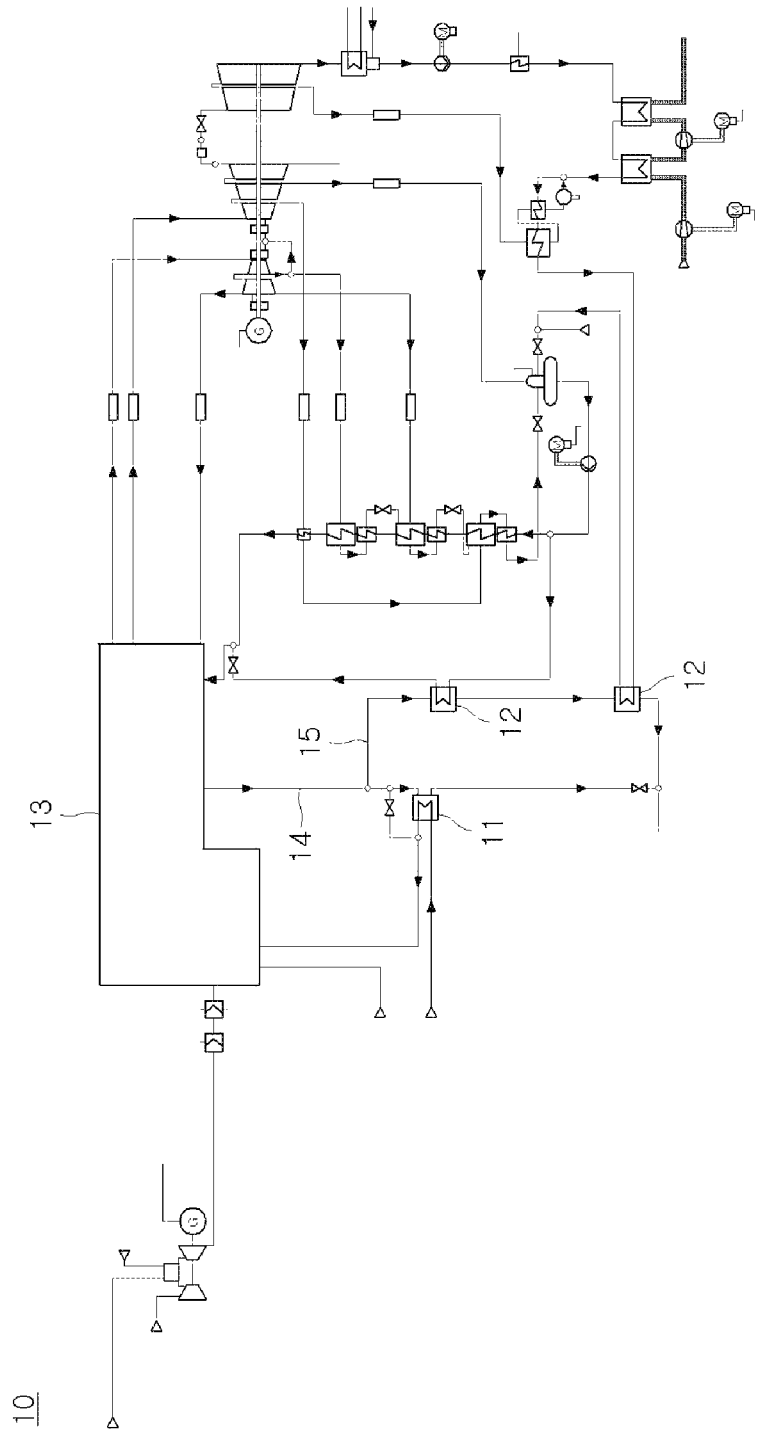
FIG. 1 is a diagram of a hybrid power generation facility according to a related art.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

Figure 2:
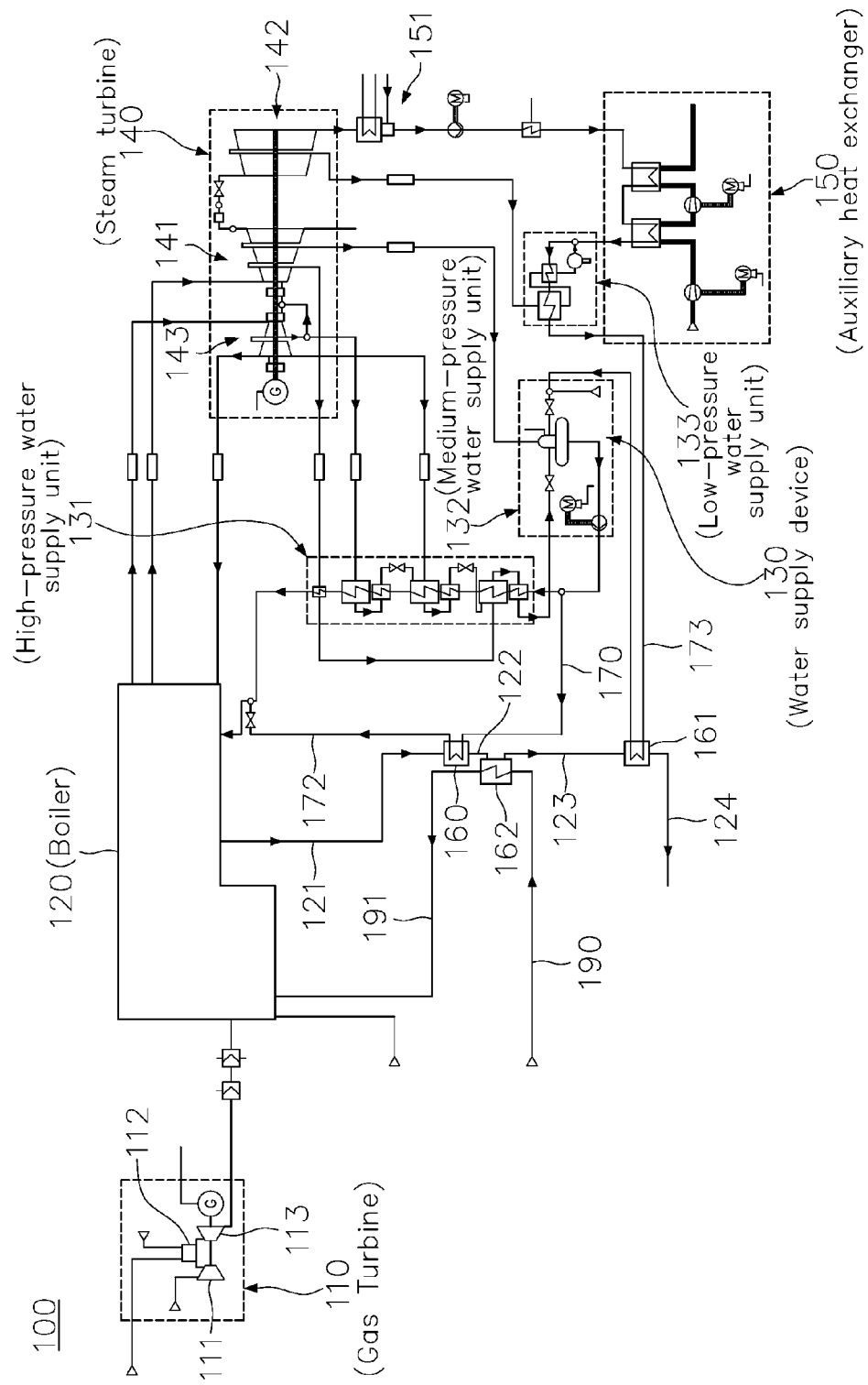
FIG. 2 is a diagram illustrating a hybrid power generation facility according to a first exemplary embodiment.

Referring to FIG. 2, a hybrid power generation facility 100 according to a first exemplary embodiment includes a gas turbine 110, a boiler 120, a water supply device 130, a steam turbine 140, an auxiliary heat exchanger 150, a first water heat exchanger 160, a second water heat exchanger 161, and a first air preheater 162.

The gas turbine 110 uses natural gas as fuel to generate a driving force used for power generation. The gas turbine 110 includes a compressor 111, a combustor 112, and a turbine 113. The compressor 111 compresses air introduced from an outside to produce compressed air. The combustor 112 mixes the compressed air supplied from the compressor 111 with fuel and burns the air-fuel mixture. The turbine 113 generates a driving force used for generation of electric power using first combustion gas supplied from the combustor 112.

The boiler 120 receives the first combustion gas from the gas turbine 110, mixes the first combustion gas with fuel, and burns the fuel-gas mixture. The first water heat exchanger 160 is configured to pass second combustion gas discharged from the boiler 120 and to heat water by heat exchange with the second combustion gas. The water supply device 130 supplies water to the first water heat exchanger 160. The steam turbine 140 is configured to pass steam generated by the boiler 120. That is, intermediate-pressure and intermediate-temperature feed water supplied to the boiler 120 is heated in the boiler 120 and is converted into superheated steam which is supplied to the steam turbine 140. The steam turbine 140 includes a high-pressure turbine 143, an intermediate-pressure turbine 141, and a low-pressure turbine 142. The high-pressure turbine 143 is configured to pass high-pressure steam. The intermediate-pressure turbine 141 is connected to the high-pressure turbine 143 and passes intermediate-pressure steam passing through the high-pressure turbine 143. The low-pressure turbine 142 is connected to the intermediate-pressure turbine 141 and passes low-pressure steam passing through the intermediate-pressure turbine 141. The water supply device 130 includes a high-pressure water supplier 131, an intermediate-pressure water supplier 132, and a low-pressure water supplier 133. The high-pressure water supplier 131 receives steam that has passed through the high-pressure turbine 143. The intermediate-pressure water supplier 132 receives steam that has passed through the intermediate-pressure turbine 141. The low-pressure water supplier 133 receives steam that has passed through the low-pressure turbine 142.

The first air preheater 162 passes the second combustion gas discharged from the first water heat exchanger 160 and also passes the air supplied to the boiler 120. Accordingly, the first air preheater 162 preheats air supplied to the boiler 120 through heat exchange between the second combustion gas and air.

The second water heat exchanger 161 passes the second combustion gas discharged from the first air preheater 162 and also passes the water supplied from the water supply device 130. Thus, water supplied from the outside is heated by the second combustion gas in the second water heat exchanger 161. The water supplied from the intermediate-pressure water supplier 132 passes through the first water heat exchanger 160. The water supplied from the low-pressure water supplier 133 passes through the second water heat exchanger 161.

The auxiliary heat exchanger 150 passes water supplied to the low-pressure water supplier 133 from the condenser 151. In addition, high-temperature and high-pressure carbon dioxide discharged from the boiler 120 is collected and compressed. The compressed carbon dioxide also passes through the auxiliary heat exchanger 150. As the high-temperature and high-pressure carbon dioxide and water exchange heat while passing through the auxiliary heat exchanger 150, the water is heated and is supplied to the low-pressure water supplier 133. When the second combustion gas discharged from the boiler 120 passes through a carbon dioxide collecting device, the carbon dioxide present in the second combustion gas is collected by the carbon dioxide collecting device and then compressed. The compressed carbon dioxide is supplied to the auxiliary heat exchanger 150. The carbon dioxide supplied to the auxiliary heat exchanger 150 heats the water in the auxiliary heat exchanger 150 and then flows out. The carbon dioxide discharged from the auxiliary heat exchanger 150 moves to the outside (e.g., to an oil drilling well).

The hybrid power generation facility 100 according to the first exemplary embodiment further includes a first boiler pipeline 121, a second boiler pipeline 122, a third boiler pipeline 123, a fourth boiler pipeline 124, and a first water pipeline 170, a third water pipeline 172, a fourth water pipeline 173, a first air pipeline 190, and a second air pipeline 191.

The first boiler pipeline 121 transfers the second combustion gas from the boiler 120 to the first water heat exchanger 160. The second boiler pipeline 122 transfers the second combustion gas from the first water heat exchanger 160 to the first air preheater 162. The third boiler pipeline 123 transfers the second combustion gas from the first air preheater 162 to the second water heat exchanger 161. The fourth boiler pipeline 124 discharges the second combustion gas discharged from the second water heat exchanger 161 to the outside (e.g., to a stack).

The first water pipeline 170 transfers water from the intermediate-pressure water supplier 132 to the first water heat exchanger 160. The water discharged from the first water heat exchanger 160 passes through the third water pipeline 172. The fourth water pipeline 173 transfers water from the low-pressure water supplier 133 to the second water heat exchanger 161.

The first air pipeline 190 supplies air from the outside to the first air preheater 162. The second air pipeline 191 transfers air from the first air preheater 162 to the boiler 120.

The hybrid power generation facility according to the present disclosure is designed such that the second combustion gas discharged from the boiler 120 sequentially passes through the first boiler pipeline 121, the first water heat exchanger 160, the second boiler pipeline 122, the first air preheater 162, the third boiler pipeline 123, and the second water heat exchanger 161. Therefore, the overall construction and operation of the hybrid power generation facility are simple because unnecessary parts such as bypass pipelines can be omitted.

Figure 3:
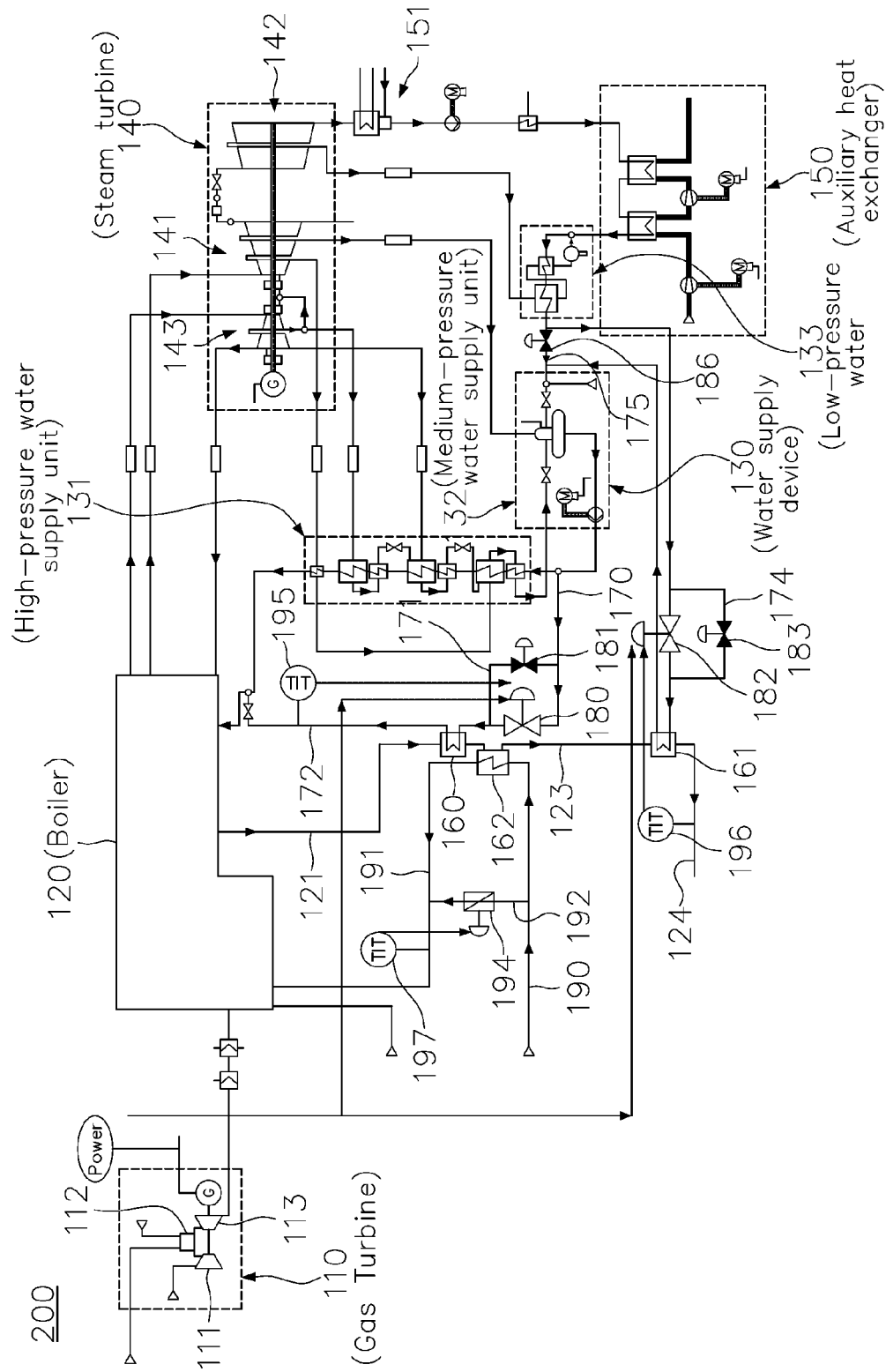
FIG. 3 is a diagram illustrating a hybrid power generation facility according to a second exemplary embodiment, in which first and third water valves are opened and second and fourth water valves are closed.
Figure 4:
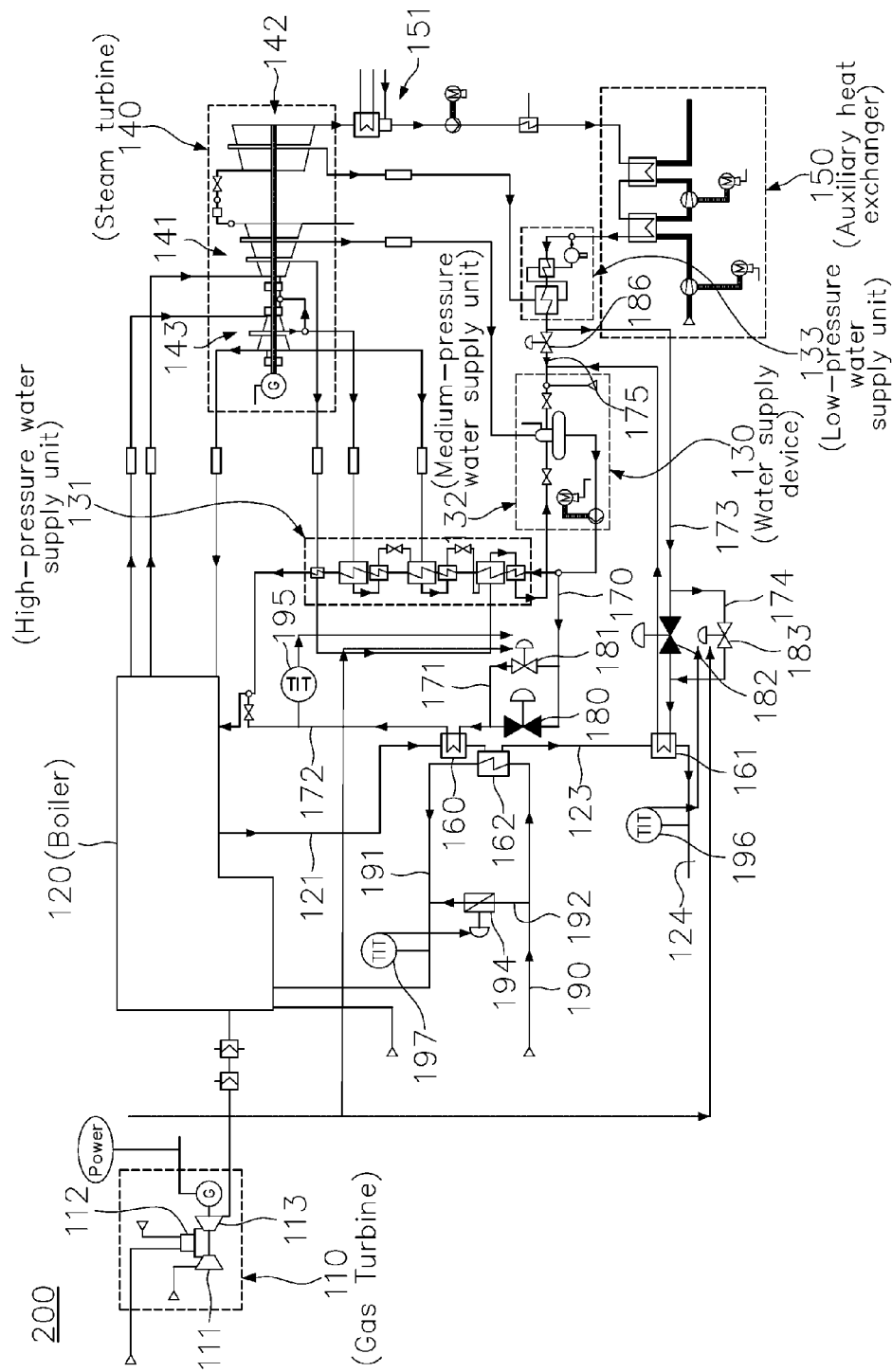
FIG. 4 is a diagram illustrating a hybrid power generation facility according to the second exemplary embodiment, in which first and third water valves are closed and second and fourth water valves are opened.

Referring to FIGS. 3 and 4, a hybrid power generation facility 200 according to a second exemplary embodiment further includes a second water pipeline 171, a fifth water pipeline 174, a first water valve 180, a second water valve 181, a third water valve 182, a fourth water valve 183, a third air pipeline 192, a first temperature sensor 195, a second temperature sensor 196, a third temperature sensor 197, a damper 194, a sixth water pipeline 175, and a fifth water valve 186, as compared to the hybrid power generation facility 100 according to the first exemplary embodiment illustrated in FIG. 1.

The second water pipeline 171 is connected in parallel with the first water pipeline 170 and supplies water to the first water heat exchanger 160. The fifth water pipeline 174 is connected in parallel with the fourth water pipeline 173 and supplies water to the second water heat exchanger 161.

The first water valve 180 is installed in the first water pipeline 170. The second water valve 181 is installed in the second water pipeline 171. The third water valve 182 is installed in the fourth water pipeline 173. The fourth water valve 183 is installed in the fifth water pipeline 174. If the first water valve 180 and the second water valve 181 are fully opened, a flow rate of fluid flowing through the first water valve 180 is greater than a flow rate of the fluid flowing through the second water valve 181. If the third water valve 182 and the fourth water valve 183 are fully opened, a flow rate of fluid flowing through the third water valve 182 is greater than a flow rate of the fluid flowing through the fourth water valve 183.

The third air pipeline 192 connects the first air pipeline 190 and the second air pipeline 191.

The first temperature sensor 195 is installed in the third water pipeline 172 and measures a temperature of water flowing through the third water pipeline 172. The second temperature sensor 196 is installed in the fourth boiler pipeline 124 and measures a temperature of fluid flowing through the fourth boiler pipeline 124. The third temperature sensor 197 is installed in the second air pipeline 191 and measures a temperature of air flowing through the second air pipeline 191. The damper 194 is installed in the third air pipeline 192 and adjusts a flow rate of air flowing through the third air pipeline 192 according to the temperature measured by the third temperature sensor 197.

The third temperature sensor 197 is disposed downstream than a junction of the second air pipeline 191 and the second air pipeline 192 in a flow direction of air flowing through the second air pipeline 191.

Referring to FIG. 3, if an output of the gas turbine 110 has a value greater than or equal to a first reference output value (e.g., 30% of the maximum output of the gas turbine), the first water valve 180 is opened and the second water valve 181 is closed. In addition, if the temperature of the water measured by the first temperature sensor 195 is higher than an upper limit of a first reference temperature range that is preset, an opening of the first water valve 180 increases. On the other hand, if the temperature of the water measured by the first temperature sensor 195 is lower than a lower limit of the first reference temperature range, the opening of the first water valve 180 decreases.

Referring to FIG. 3, if the output of the gas turbine 110 has a value greater than or equal to the first reference output value, the third water valve 182 is opened and the fourth water valve 183 is closed. If the temperature of the second combustion gas measured by the second temperature sensor 196 is higher than an upper limit of a third reference temperature range that is preset, an opening of the third water valve 182 increases. On the other hand, if the temperature of the second combustion gas measured by the second temperature sensor 196 is lower than a lower limit of the third reference temperature range, the opening of the third water valve 182 decreases.

Referring to FIG. 4, if the output of the gas turbine 110 has a value less than the first reference output value, the first water valve 180 is closed and the second water valve 181 is opened. In addition, if the temperature of the water measured by the first temperature sensor 195 is higher than an upper limit of a second reference temperature range that is preset, an opening of the second water valve 181 increases. On the other hand, if the temperature of the water measured by the first temperature sensor 195 is lower than a lower limit of the second reference temperature range, the opening of the second water valve 181 decreases.

Referring to FIG. 4, if the output of the gas turbine 110 has a value less than the first reference output value, the third water valve 182 is closed and the fourth water valve 183 is opened. If the temperature of the second combustion gas measured by the second temperature sensor 196 is higher than an upper limit of a fourth reference temperature range that is preset, an opening of the fourth water valve 183 increases. On the other hand, if the temperature of the second combustion gas measured by the second temperature sensor 196 is lower than a lower limit of the fourth reference temperature range, the opening of the fourth water valve 183 decreases.

According to the second exemplary embodiment, the temperature of the fluid flowing through the third water pipeline 172 can be adjusted within a predetermined target temperature range, and the temperature of the fluid flowing through the fourth boiler pipeline 124 can be adjusted within a predetermined target temperature range. Therefore, the overall operation efficiency of the facility can be improved.

The sixth water pipeline 175 transfers water from the low-pressure water supplier 133 to the intermediate-pressure water supplier 132. The fifth water valve 186 is installed in the sixth water pipeline 175 and selectively opens and closes the sixth water pipeline 175.

Referring to FIG. 3, if the output of the gas turbine 110 has a value greater than or equal to the first reference output value, the fifth water valve 186 closes the sixth water pipeline 175 so that water discharged from the low-pressure water supplier 133 is entirely supplied to the fourth water pipeline 173. On the contrary, referring to FIG. 4, if the output of the gas turbine 110 has a value less than the first reference output value, the fifth water valve 186 opens the sixth water pipeline 175 so that a portion of the water discharged from the low-pressure water supplier 133 is supplied to the intermediate-pressure water supplier 132 through the sixth water pipeline 175 and remaining water is supplied to the fourth water pipeline 173.

If the first water valve 180 and the second water valve 181 are fully opened, the flow rate of fluid flowing through the first water valve 180 is greater than the flow rate of the fluid flowing through the second water valve 181. If the third water valve 182 and the fourth water valve 183 are fully opened, the flow rate of fluid flowing through the third water valve 182 is greater than the flow rate of the fluid flowing through the fourth water valve 183. Therefore, the amount of water supplied to the first water heat exchanger 160 and the second water heat exchanger 161 in the operating state of FIG. 4 is reduced compared to the operation state of FIG. 3. In the operating state of FIG. 4, the fifth water valve 186 opens the sixth water pipeline 175 to supply the reduced amount of water to the intermediate-pressure water supplier 132 through the sixth water pipeline 175.

Figure 5:
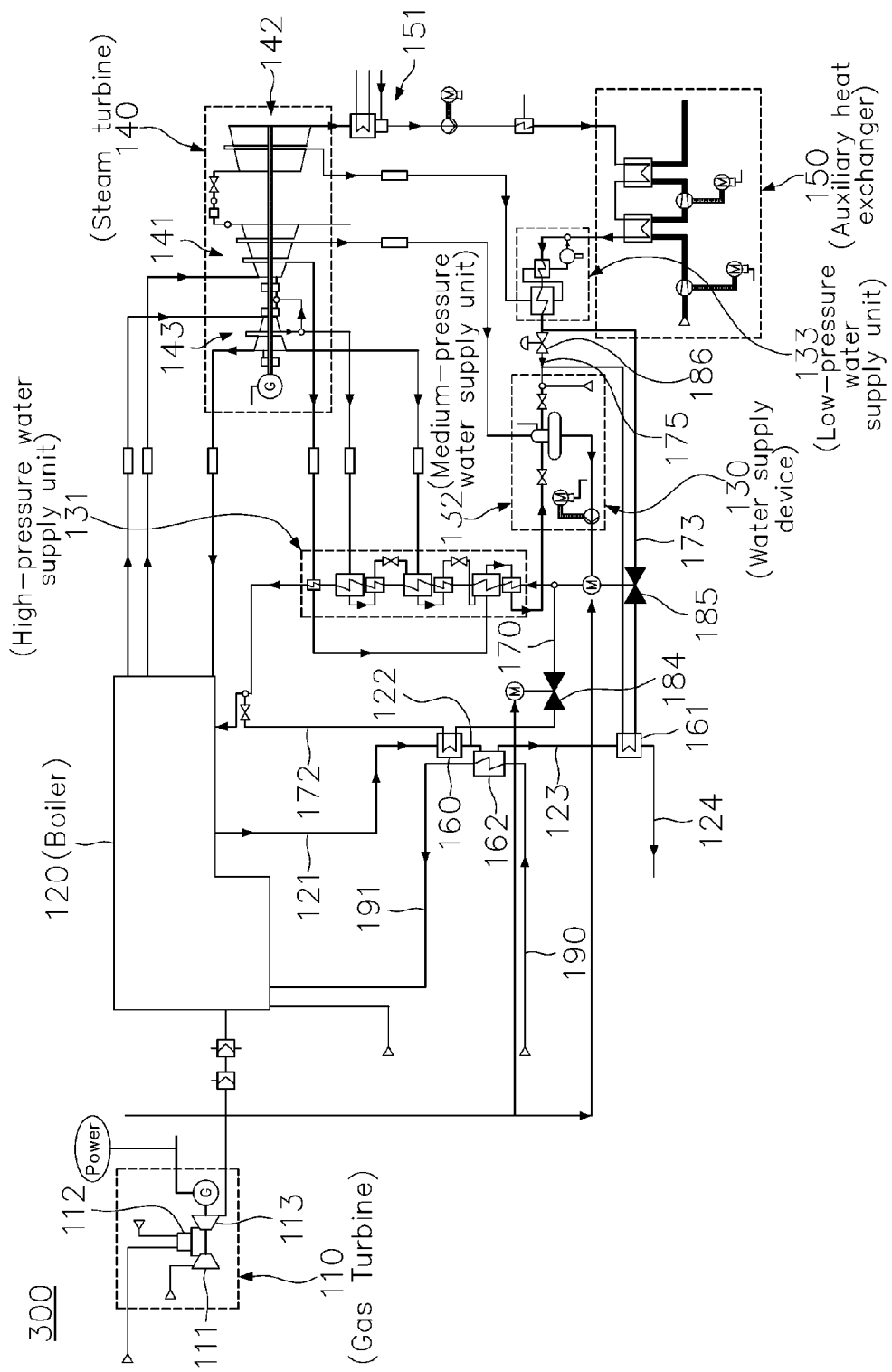
FIG. 5 is a diagram illustrating a hybrid power generation facility according to a third exemplary embodiment.

Referring to FIG. 5, a hybrid power generation facility 300 according to a third exemplary embodiment further includes a first shut-off valve 184, a second shut-off valve 185, a sixth water pipeline 175, and a fifth water valve 186, as compared to the hybrid power generation facility according to the first exemplary embodiment illustrated in FIG. 1.

The first shut-off valve 184 is installed in the first water pipeline 170. The second shut-off valve 185 is installed in the fourth water pipeline 173. If the output of the gas turbine 110 has a value less than a second reference output value (e.g., 5% of the maximum output of the gas turbine), the first shut-off valve 184 closes the first water pipeline 170. According to the third exemplary embodiment, the entire thermal energy of the second combustion gas discharged from the boiler 120 is used to heat air supplied from the first air preheater 162 to the boiler 120.

In the third exemplary embodiment, the second shut-off valve 185 may be closed or opened. If the temperature of the second combustion gas discharged from the first air preheater 162 is lower than the temperature of water flowing through the fourth water pipeline 174, the second shut-off valve 185 closes the fourth water pipeline 173 to prevent water from being supplied to the second water heat exchanger 161. Accordingly, the second shut-off valve 185 prevents the thermal energy of water flowing through the fourth water pipeline 173 from being used to heat the second combustion gas in the second water heat exchanger 161. Conversely, if the temperature of the second combustion gas discharged from the first air preheater 162 is higher than the temperature of water flowing through the fourth water pipeline 174, the second shut-off valve 185 opens the fourth water pipeline 173 so that water is supplied to the second water heat exchanger 161 through the fourth water line 173. That is, the second shut-off valve 185 allows the water to be heated with the thermal energy of the second combustion gas in the second water heat exchanger 161.

According to the third exemplary embodiment, in a situation in which the output of the gas turbine 110 does not reach a target level, it is possible to prevent water from being supplied from the water supply device 130 to the first water heat exchanger 160 so that the first air preheater 162 can supply a sufficient amount of heat from the second combustion gas to the air.

The sixth water pipeline 175 transfers water from the low-pressure water supplier 133 to the intermediate-pressure water supplier 132. The fifth water valve 186 is installed in the sixth water pipeline 175 and selectively opens and closes the sixth water pipeline 175.

In an operation mode illustrated in FIG. 5, the fifth water valve 186 opens the sixth water pipeline 175 so that water discharged from the low-pressure water supplier 133 is supplied to the intermediate-pressure water supplier 132 through the sixth water pipeline 175. At this time, if the second shut-off valve 185 opens the fourth water pipeline 173, a portion of the water discharged from the low-pressure water supplier 133 is supplied to the intermediate-pressure water supplier 132 through the sixth water pipeline 175, and remaining water is supplied to the fourth water pipeline 173. Conversely, if the second shut-off valve 185 closes the fourth water pipeline 173, the entire water discharged from the low-pressure water supplier 133 is supplied to the intermediate-pressure water supplier 132 through the sixth water pipeline 175.

Figure 6:
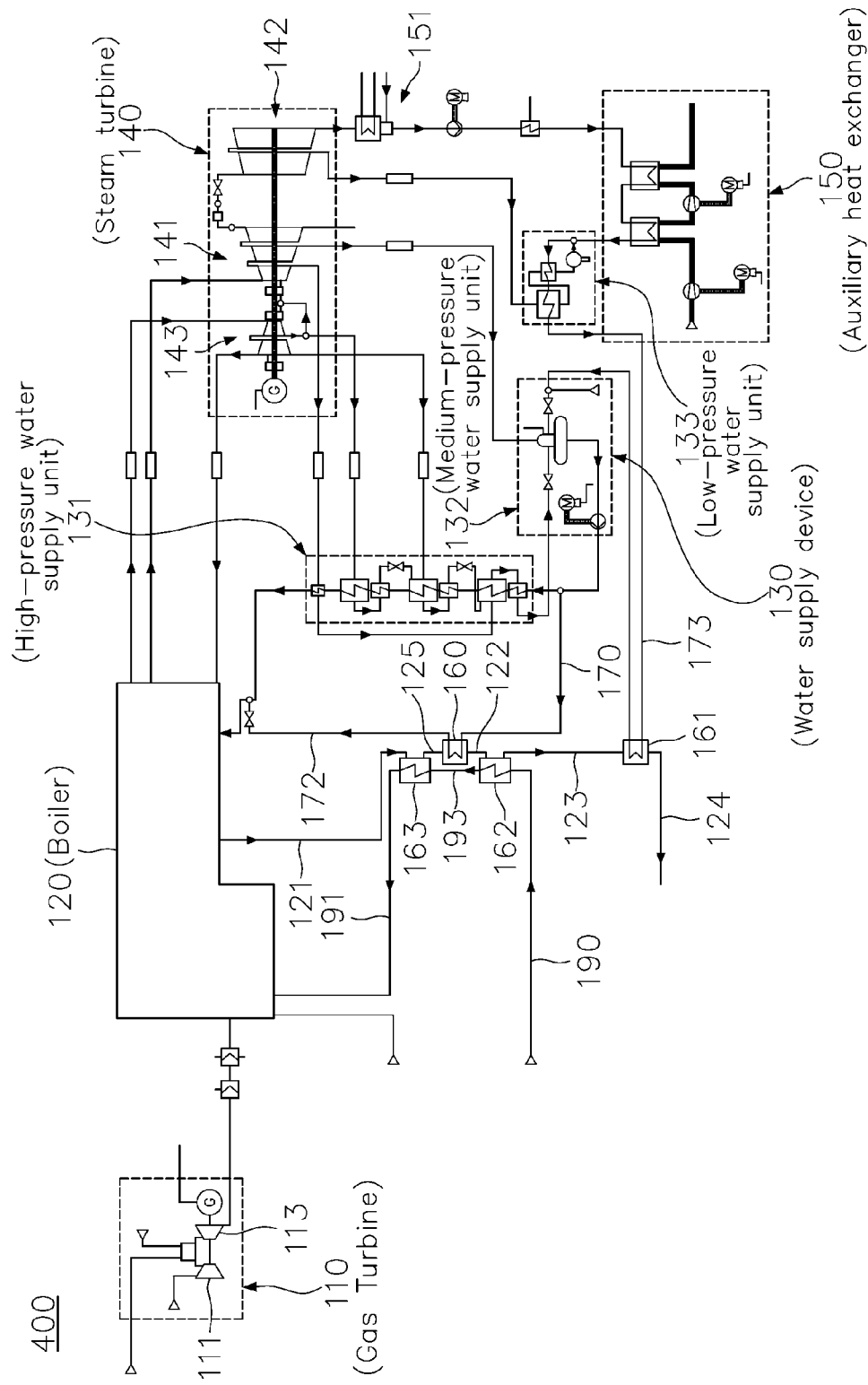
FIG. 6 is a diagram illustrating a hybrid power generation facility according to a fourth exemplary embodiment.

Referring to FIG. 6, a hybrid power generation facility 400 according to a fourth exemplary embodiment further includes a second air preheater 163, a fourth air pipeline 193, and a fifth boiler pipeline 125, as compared to the hybrid power generation facility according to the first exemplary embodiment illustrated in FIG. 1.

The air discharged from the first air preheater 162 passes through the second air preheater 163, and the second combustion gas discharged from the boiler 120 also passes through the second air preheater 163.

In the fourth exemplary embodiment, the first boiler pipeline 121 transfers the second combustion gas from the boiler 120 to the second air preheater 163. The second air pipeline 191 transfers air from the second air preheater 163 to the boiler 120.

The fifth boiler pipeline 125 transfers the second combustion gas from the second air preheater 163 to the first water heat exchanger 160. The fourth air pipeline 193 transfers air from the first air preheater 162 to the second air preheater 163.

According to the fourth exemplary embodiment, because multiple air preheaters are provided, the air supplied to the boiler 120 is heated through multiple stages.

What is claimed is:

1. A hybrid power generation facility comprising:
   a gas turbine including a compressor configured to compress air introduced from an outside, a combustor configured to mix the compressed air with fuel and to combust the air and fuel mixture, and a turbine configured to produce power with first combustion gas discharged from the combustor;
   a boiler including a combustion chamber and configured to burn a mixture of the first combustion gas and air;
   a first water heat exchanger configured to pass second combustion gas discharged from the boiler and to heat water through heat exchange with the second combustion gas;
   a water supply device configured to supply water to the first water heat exchanger;
   a steam turbine through which steam generated in the combustion chamber passes; and
   a first air preheater configured to pass second combustion gas discharged from the first water heat exchanger and to pass air supplied to the boiler.

2. The hybrid power generation facility according to claim 1, further comprising:
a first boiler pipeline configured to transfer second combustion gas from the boiler to the first water heat exchanger; and
a second boiler pipeline configured to transfer second combustion gas from the first water heat exchanger to the first air preheater.

3. The hybrid power generation facility according to claim 1, wherein the steam turbine includes an intermediate-pressure turbine and a low-pressure turbine connected to the intermediate-pressure turbine and configured to pass steam having a pressure smaller than that of steam flowing through the intermediate-pressure turbine,
wherein the water supply device includes an intermediate-pressure water supplier configured to receive steam passing through the intermediate-pressure turbine and a low-pressure water supplier configured to receive steam passing through the low-pressure turbine, and
wherein the first water heat exchanger is configured to pass water supplied from the intermediate-pressure water supplier.

4. The hybrid power generation facility according to claim 3, further comprising a second water heat exchanger configured to pass second combustion gas discharged from the first air preheater and to pass water supplied to the boiler.

5. The hybrid power generation facility according to claim 4, further comprising a third boiler pipeline configured to transfer second combustion gas from the first air preheater to the second water heat exchanger.

6. The hybrid power generation facility according to claim 3, further comprising an auxiliary heat exchanger configured to pass water supplied from a condenser to the low-pressure water supplier and to pass carbon dioxide that is collected from the second combustion gas discharged from the boiler and is compressed to heat water.

7. The hybrid power generation facility according to claim 3, further comprising:
a first water pipeline configured to transfer water from the intermediate-pressure water supplier to the first water heat exchanger;
a second water pipeline connected in parallel with the first water pipeline and configured to supply water to the first water heat exchanger;
a first water valve installed in the first water pipeline; and
a second water valve installed in the second water pipeline and configured to have a lower flow rate of fluid than the first water valve if the first and second water valves are fully opened.

8. The hybrid power generation facility according to claim 7, wherein if an output of the gas turbine has a value greater than or equal to a first reference output value that is preset, the first water valve is opened and the second water valve is closed, and
wherein if the output of the gas turbine has a value less than the first reference output value, the first water valve is closed and the second water valve is opened.

9. The hybrid power generation facility according to claim 8, further comprising:
a third water pipeline configured to flow water discharged from the first water heat exchanger; and
a first temperature sensor installed in the third water pipeline and configured to measure a temperature of water flowing through the third water pipeline,
wherein in a state in which the output of the gas turbine has a value equal to or greater than the first reference output value, an opening of the first water valve increases if the temperature of water measured by the first temperature sensor is higher than an upper limit of a first reference temperature range that is preset, and the opening of the first water valve decreases if the temperature of the water measured by the first temperature sensor is lower than a lower limit of the first reference temperature range, and
wherein in a state in which the output of the gas turbine has a value less than the first reference output value, an opening of the second water valve increases if the temperature of water measured by the first temperature sensor is higher than an upper limit of a second reference temperature range that is preset, and the opening of the second water valve decreases if the temperature of the water measured by the first temperature sensor is lower than a lower limit of the second reference temperature range.

10. The hybrid power generation facility according to claim 4, further comprising:
a fourth water pipeline configured to transfer water from the low-pressure water supplier to the second water heat exchanger;
a fifth water pipeline connected in parallel with the fourth water pipeline and configured to supply water to the second water heat exchanger;
a third water valve installed in the fourth water pipeline; and
a fourth water valve installed in the fifth water pipeline and configured to have a lower flow rate of fluid than the first water valve if the third and fourth water valves are fully opened.

11. The hybrid power generation facility according to claim 10, wherein if an output of the gas turbine has a value greater than or equal to a first reference output value that is preset, the third water valve is opened and the fourth water valve is closed, and
wherein if the output of the gas turbine has a value less than the first reference output value, the third water valve is closed and the fourth water valve is opened.

12. The hybrid power generation facility according to claim 11, further comprising:
a fourth boiler pipeline configured to pass second combustion gas discharged from the second water heat exchanger; and
a second temperature sensor installed in the fourth boiler pipeline and configured to measure a temperature of the second combustion gas flowing through the fourth boiler pipeline,
wherein in a state in which the output of the gas turbine has a value equal to or greater than the first reference output value, an opening of the third water valve increases if the temperature of second combustion gas measured by the second temperature sensor is higher than an upper limit of a third reference temperature range that is preset, and the opening of the third water valve decreases if the temperature of the second combustion gas measured by the second temperature sensor is lower than a lower limit of the third reference temperature range, and
wherein in a state in which the output of the gas turbine has a value less than the first reference output value, an opening of the fourth water valve increases if the temperature of second combustion gas measured by the second temperature sensor is higher than an upper limit of a fourth reference temperature range that is preset, and the opening of the fourth water valve decreases if the temperature of the second combustion gas measured by the second temperature sensor is lower than a lower limit of the fourth reference temperature range.

13. The hybrid power generation facility according to claim 1, further comprising:
a first air pipeline configured to supply air to the first air preheater;
a second air pipeline configured to transfer air from the first air preheater to the boiler;
a third air pipeline connecting the first air pipeline and the second air pipeline;
a third temperature sensor installed in the second air pipeline and configured to measure a temperature of air flowing through the second air pipeline; and
a damper installed in the third air pipeline and configured to adjust a flow rate of air flowing through the third air pipeline according to an air temperature measured by the third temperature sensor.

14. The hybrid power generation facility according to claim 13, wherein the third temperature sensor is disposed downstream than a junction of the second air pipeline and the third air pipeline in a flow direction of air flowing through the second air pipeline.

15. The hybrid power generation facility according to claim 8, further comprising:
a sixth water pipeline configured to transfer water from the low-pressure water supplier to the intermediate-pressure water supplier; and
a fifth water valve installed in the sixth water pipeline to open and close the sixth water pipeline,
wherein the fifth water valve is closed if an output of the gas turbine has a value greater than or equal to a first reference output value that is preset, and
the fifth water valve is opened if the output of the gas turbine has a value less than the first reference output value.

16. The hybrid power generation facility according to claim 3, further comprising:
a first water pipeline configured to transfer water from the intermediate-pressure water supplier to the first water heat exchanger;
a fourth water pipeline configured to transfer water from the low-pressure water supplier to the second water heat exchanger;
a first shut-off valve installed in the first water pipeline; and
a second shut-off valve installed in the fourth water pipeline,
wherein if the output of the gas turbine has a value less than the second reference output value, the first shut-off valve closes the first water pipeline.

17. The hybrid power generation facility according to claim 16, further comprising:
a sixth water pipeline configured to transfer water from the low-pressure water supplier to the intermediate-pressure water supplier; and
a fifth water valve installed in the sixth water pipeline to open and close the sixth water pipeline,
wherein the fifth water valve is opened if the output of the gas turbine has a value less than the second reference output value.

18. The hybrid power generation facility according to claim 1, further comprising:
a second air preheater configured to pass air discharged from the first air preheater and to pass second combustion gas discharged from the boiler;
a first boiler pipeline configured to transfer second combustion gas from the boiler to the second air preheater;
a fifth boiler pipeline configured to transfer second combustion gas from the second air preheater to the first water heat exchanger;
a second air pipeline configured to transfer air from the second air preheater to the boiler; and
a fourth air pipeline configured to transfer air from the first air preheater to the second air preheater.

* * * * *